United States Patent
Wahl et al.

(10) Patent No.: US 11,506,338 B2
(45) Date of Patent: Nov. 22, 2022

(54) INTERNAL CASING FOR PRESSURIZED FLUID STORAGE TANK FOR A MOTOR VEHICLE

(71) Applicant: PLASTIC OMNIUM ADVANCED INNOVATION AND RESEARCH, Bruxelles (FR)

(72) Inventors: Jeremy Wahl, Brussels (BE); Bjorn Criel, Brussels (BE); Pierre De Keyzer, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 17/297,846

(22) PCT Filed: Nov. 27, 2019

(86) PCT No.: PCT/EP2019/082764
§ 371 (c)(1),
(2) Date: May 27, 2021

(87) PCT Pub. No.: WO2020/109398
PCT Pub. Date: Jun. 4, 2020

(65) Prior Publication Data
US 2022/0034452 A1     Feb. 3, 2022

(30) Foreign Application Priority Data
Nov. 30, 2018    (FR) ...................... 18 72197

(51) Int. Cl.
*F17C 1/16*    (2006.01)
*B32B 1/08*    (2006.01)
*B32B 5/02*    (2006.01)

(52) U.S. Cl.
CPC .................. *F17C 1/16* (2013.01); *B32B 1/08* (2013.01); *B32B 5/02* (2013.01);
(Continued)

(58) Field of Classification Search
CPC .. Y02E 60/32; B32B 1/08; B32B 5/02; B32B 2260/021; B32B 2260/046;
(Continued)

(56) References Cited

U.S. PATENT DOCUMENTS

| 3,843,010 A | 10/1974 | Morse et al. |
| 7,556,171 B2 | 7/2009 | Ishimaru |

(Continued)

FOREIGN PATENT DOCUMENTS

| CN | 1272769 A | 11/2000 |
| CN | 101472722 A | 7/2009 |

(Continued)

OTHER PUBLICATIONS

International Search Report dated Feb. 20, 2020 in PCT/EP2019/082764 filed Nov. 27, 2019, 3 pages.

(Continued)

*Primary Examiner* — Camie S Thompson
(74) *Attorney, Agent, or Firm* — Oblon, McClelland, Maier & Neustadt, L.L.P.

(57) ABSTRACT

An internal casing for a pressurized fluid storage tank for a motor vehicle includes: a hollow body includes a layer made of a first polymer material; and a neck arranged on the hollow body and delimiting an opening of the hollow body, the neck receiving an interface part mounted on the neck in a sealed manner by a gasket arranged between the neck and the interface part. The neck is made of a composite material composed of a second polymer material loaded with reinforcing fibers, the composite material having a deformation resistance than that of the first polymer material. The neck is joined to the hollow body by molecular entanglement of polymer chains of the first polymer material and polymer chains of the second polymer material. Methods for manu- (Continued)

facturing such an internal casing, and a storage tank including such an internal casing are disclosed.

19 Claims, 3 Drawing Sheets

(52) U.S. Cl.
CPC ... *B32B 2260/021* (2013.01); *B32B 2260/046* (2013.01); *F17C 2201/0109* (2013.01); *F17C 2203/0604* (2013.01); *F17C 2203/0619* (2013.01); *F17C 2203/0673* (2013.01); *F17C 2203/0675* (2013.01); *F17C 2205/0305* (2013.01); *F17C 2209/219* (2013.01); *F17C 2209/2118* (2013.01); *F17C 2209/2127* (2013.01); *F17C 2209/2145* (2013.01); *F17C 2209/221* (2013.01); *F17C 2221/012* (2013.01); *F17C 2223/036* (2013.01); *F17C 2260/011* (2013.01); *F17C 2260/036* (2013.01); *F17C 2270/0171* (2013.01); *F17C 2270/0178* (2013.01)

(58) Field of Classification Search
CPC ........ F17C 2221/012; F17C 2223/0123; F17C 2223/036; F17C 2209/2127; F17C 2209/2109; F17C 2209/2118; F17C 2203/0604; F17C 2203/0619; F17C 2203/0663; F17C 2203/066; F17C 2203/0673; F17C 2203/0675; F17C 2270/0168; F17C 1/16; F17C 2201/1019; F17C 2260/011; F17C 2260/036; F17C 2270/0171; F17C 2270/0178; F17C 2205/0305; B29L 2031/7156; B29L 2031/0123; B29L 2031/036; B29C 70/84; B29C 49/02; B29K 2077/00; B29K 2023/04; B29K 2023/06; B29K 2067/003; B29K 2105/258; B29K 2105/06
USPC .................................. 428/36.4; 264/250, 537
See application file for complete search history.

(56) References Cited

U.S. PATENT DOCUMENTS

| | | |
|---|---|---|
| 8,501,077 B2 | 8/2013 | Strack |
| 8,523,002 B2 | 9/2013 | Strack et al. |
| 9,353,910 B2 | 5/2016 | Ulekleiv et al. |
| 2009/0255940 A1 | 10/2009 | Murate et al. |
| 2009/0266823 A1 | 10/2009 | Mazabraud et al. |
| 2011/0210128 A1 | 9/2011 | Strack et al. |
| 2011/0210475 A1 | 9/2011 | Strack et al. |
| 2011/0304083 A1 | 12/2011 | Strack |
| 2014/0299610 A1 | 10/2014 | Ulekleiv et al. |
| 2014/0349094 A1 | 11/2014 | Jonza et al. |
| 2015/0096993 A1 | 4/2015 | Nettis et al. |
| 2017/0268724 A1 | 9/2017 | Kanezaki et al. |
| 2018/0119881 A1 | 5/2018 | Nony et al. |

FOREIGN PATENT DOCUMENTS

| | | |
|---|---|---|
| CN | 104053547 A | 9/2014 |
| CN | 108119748 A | 6/2018 |
| DE | 10 2014 009 341 A1 | 12/2015 |
| DE | 10 2014 009 343 A1 | 12/2015 |
| EP | 0 874 187 A1 | 10/1998 |
| EP | 0 815 383 B1 | 10/2002 |
| EP | 0 810 081 B1 | 3/2003 |
| EP | 1 989 477 A1 | 11/2008 |
| EP | 2 788 662 A1 | 10/2014 |
| FR | 3 035 173 A1 | 10/2016 |
| JP | 2005-48919 A | 2/2005 |
| JP | 2009-121624 A | 6/2009 |
| JP | 2011-2006 A | 1/2011 |
| JP | 2013-137092 A | 7/2013 |
| JP | 2014-222081 A | 11/2014 |
| JP | WO2016/167034 A1 | 10/2016 |
| JP | 2017-166535 A | 9/2017 |
| WO | WO 99/17630 A1 | 4/1999 |
| WO | WO 2007/079971 A1 | 7/2007 |
| WO | WO 2009/128818 A1 | 10/2009 |
| WO | WO 2013/083173 A1 | 6/2013 |
| WO | WO 2015/197357 A1 | 12/2015 |
| WO | WO 2015/197457 A1 | 12/2015 |

OTHER PUBLICATIONS

Notice of Reasons for Rejection dated Oct. 4, 2021 in Japanese Patent Application No. 2021-518893 (with English language translation), 6 pages.

Notice of Grounds for Rejection dated Oct. 6, 2021 in Korean Patent Application No. 10-2021-7017079 (with English language translation), 23 pages.

INTERNAL CASING FOR PRESSURIZED FLUID STORAGE TANK FOR A MOTOR VEHICLE

The present invention relates to the field of pressurized fluid storage tanks, in particular for motor vehicles. More specifically, the invention relates to an internal casing for a pressurized fluid storage tank for a motor vehicle.

Tanks for pressurized fluid are already known in the prior art, which tanks comprise an internal casing, also called a liner, which is provided with a neck that forms a seal with a base by means of a gasket. However, one problem is that the neck deforms under the action of the gasket and produces leaks.

One solution for ensuring the sealing effect would be to provide a more resistant material, but a drawback is that the internal casing would be thicker, heavier or more expensive. Another solution would be to provide an insert on the neck, for example a metal insert, but an insert of this kind is also heavy and complicates the manufacturing process.

The object of the invention is, in particular, to provide an internal casing that prevents leaks but that is also relatively light.

To this end, the invention relates to an internal casing for a pressurized fluid storage tank for a motor vehicle, characterized in that it comprises:
- a hollow body comprising at least one layer made of a first polymer material,
- a neck arranged on the hollow body and delimiting an opening of the hollow body, the neck being designed to receive an interface part mounted on the neck in a sealed manner by means of a gasket arranged between the neck and the interface part, the neck being made of a composite material composed of a second polymer material loaded with reinforcing fibers,
- the composite material having a resistance to deformation that is greater than the resistance to deformation of the first polymer material, and the neck being joined to the hollow body by molecular entanglement of polymer chains of the first polymer material and polymer chains of the second polymer material.

As a result, the region of the neck requiring a higher resistance to deformation is produced in a simple, economical manner and without a significant increase in the weight of the internal casing, thanks to the use of a neck made of a composite material.

In addition, the use of polymer materials producing molecular entanglement of their respective polymer chains for the hollow body and the neck allows the neck to be assembled in a particularly resistant manner on the hollow body of the casing.

The risk of leakage is also limited to a greater extent due to a higher resistance to deformation. In particular, when elements that are in contact with the neck, for example a valve or a gasket, are replaced during a maintenance operation, the internal casing deforms less and thus there is a higher probability that it can be reused, for example with a new valve or gasket.

"Molecular entanglement of polymer chains" of a first polymer material and of a second polymer material should be understood to mean two polymer materials pressed together in the molten state such that self-adhesion occurs, the melting temperature of the two pressed polymer materials being measured on the basis of ISO 3146:2000. Self-adhesion of this kind is the intermolecular diffusion and entanglement of molecular chains through a polymer interface, resulting in a strong bond. Unlike adhesion, which concerns surface energy (or secondary chemical bonds between two materials that are either similar or not similar), self-adhesion concerns the entanglement of molecular chains and secondary bonds for polymer chains of similar materials, i.e. chemically compatible materials. Under ideal conditions, the diffusion is complete when the interface between the two polymer materials is no longer discernible from the bulk of each of the two polymer materials. For example, in the case of two thermoplastic polymer materials, once thermoplastic polymer-thermoplastic polymer contact is achieved at the interface, intermolecular diffusion and entanglement is required to complete the process and produce a good weld. A self-adhesion phenomenon of this kind is described, for example, in the publication "Plastics and Composites Welding Handbook", ISBN 1-56990-313-1, page 23. The molten state of the two polymer materials can be obtained in particular by friction, vibration, rotation, irradiation of the two polymer materials or by a component that heats the two polymer materials with or without contact.

It is therefore understood that the first polymer material and the second polymer material are chemically compatible. A first polymer material that is "chemically compatible" with a second polymer material is understood to mean that the polymer materials each comprise chemical species that can be welded together without requiring additional material. In other words, chemically compatible polymer materials are capable of bonding closely together by melting, and in particular of producing molecular entanglement of their respective polymer chains. The welding of the two polymer materials is understood to mean bringing the two polymer materials into contact in such a way that the phenomenon of self-adhesion occurs at the point of contact. The phenomenon of self-adhesion occurs when heat is applied to the point of contact. An operation for welding two materials under the action of heat is called thermowelding. In the following, "welding" is used synonymously with "thermowelding".

Welding can be carried out by friction, vibration, rotation, irradiation of the two polymer materials or by a component that heats the two polymer materials with or without contact. Some examples of welding techniques include: hot plate welding, vibration welding, ultrasonic welding, laser radiation welding, infrared radiation welding, electromagnetic induction welding, resistive implant welding, hot-gas welding, for example with nitrogen, or spin welding. A combination of two or more of these techniques is also possible, for example infrared radiation welding and vibration welding.

"Resistance to deformation" is understood to include creep resistance and/or elastic tensile strength, also called yield strength, and/or elastic compressive strength. In other words, the second polymer material preferably has a creep resistance that is greater than the creep resistance of the first material and an elastic tensile strength that is greater than the elastic tensile strength of the first material. Elastic tensile strength, i.e. yield strength, is the maximum stress that a material can withstand in its elastic range. If the applied stress is greater than the yield strength, the material deforms permanently. The yield strength of a material can be measured according to ISO 527:2012 on a sample of material subjected to a tensile elongation, for example at an elongation rate of 50 mm/min, at room temperature (23° C.). In the case of hygroscopic material such as polyamides, the tensile test is carried out after prior conditioning such that the relative moisture content in the sample is 50%. The duration of this conditioning step depends on the thickness of the sample. The shape of the samples is defined by ISO 527.

Preferably, ISO 527 type 1B or 1A samples are used. Preferably, these samples are prepared by injection. Creep resistance defines the long-term deformation of a material under stress. It is generally observed over more than 2 days, preferably over at least 500 hours and at a temperature of 50° C. in air. The creep resistance is measured according to ISO 899-1:2017. The stress applied during the test is chosen depending on the estimated maximum stress in the internal casing, in particular in the region of the neck that is in contact with the gasket. The deformation of the material as a function of time is recorded. Preferably, ISO 527 type 1B or 1A samples are used.

The second polymer material may be the same polymer material as the first polymer material or a different polymer material, for example one that is more resistant, on its own, to deformation than the first polymer material.

In a polymer material loaded with reinforcing fibers, the reinforcing fibers and the polymer material are entangled so as to form an integral material.

According to other optional features of the internal casing, taken alone or in combination:

The reinforcing fibers are chosen from the group comprising glass fibers, carbon fibers, polymer fibers, natural fibers, metal fibers, metal alloy fibers, ceramic fibers, basalt fibers. These fibers make it possible to increase the resistance to deformation of the composite material.

At least some of the reinforcing fibers form a textile reinforcement. This makes it possible to simplify the manufacture of the internal casing.

The first polymer material is thermoplastic, preferably semi-crystalline, and the second polymer material is thermoplastic, preferably semi-crystalline. This makes it possible to simplify the manufacture of the internal casing.

The first polymer material and the second polymer material are part of the same family of polymers, preferably from the family of polymers chosen from the group comprising the polyamide (PA) family, the polyphthalamide (PPA) family, the polyolefin family, the polyketone (PK) family, the polyacetal family. Preferably, copolymers and homopolymers of the aforementioned families are used. As a result, in particular due to the chemical compatibility between the first polymer material and the second polymer material, the molecular entanglement of polymer chains of the first polymer material and of the second polymer material is higher.

The second polymer material is identical to the first polymer material, for example PA6. In this case, the chemical compatibility is optimal, as is the molecular entanglement of the polymer chains.

The hollow body comprises a plurality of layers, at least one layer being made of the first polymer material. As a result, the integrity of the internal casing is preserved, while allowing the use of other layers for the hollow body, thus making it possible, for example, to increase the resistance of the internal casing to successive filling and emptying operations and/or to chemical attacks from the pressurized fluid contained within the internal casing. Preferably, one of the other layers consists of EVOH (copolymer of ethylene and vinyl alcohol), and this layer is advantageously placed between two layers of adhesive. Preferably, the adhesive layers are made of low density polyethylene grafted with maleic anhydride functions.

The invention also relates to a method for manufacturing an internal casing of the aforementioned type, which method comprises the following steps:
 providing a hollow body having an opening,
 providing a neck designed to delimit the opening of the hollow body,
 assembling the neck and the hollow body by means of welding.

The invention also relates to a method for manufacturing an internal casing of the aforementioned type, which method comprises the following steps:
 arranging a neck in a mold, the neck being designed to delimit the opening of a hollow body, the neck being made of a composite material composed of a second polymer material loaded with reinforcing fibers,
 molding a hollow body by injecting or by rotationally molding a first polymer material in the mold, wherein:
during injection or rotational molding, the first polymer material surrounds some of the composite material of the neck and the second polymer material at least partially melts upon contact with the first polymer material, such that, after injection, the first polymer material is molded over the neck and the neck is joined to the hollow body by molecular entanglement of polymer chains of the first polymer material and polymer chains of the second polymer material.

Preferably, the neck is preheated in the mold or before being positioned in the mold in order to promote the molecular entanglement of polymer chains.

The invention also relates to a method for manufacturing an internal casing of the aforementioned type, which method comprises the following steps:
 molding a hollow body in a mold by injecting a first polymer material via a first injection hole,
 simultaneously co-molding in the mold a neck delimiting an opening of the hollow body by injecting a composite material composed of a second polymer material loaded with reinforcing fibers via a second injection hole, such that, after molding, the neck is joined to the hollow body by molecular entanglement of polymer chains of the first polymer material and polymer chains of the second polymer material.

The invention also relates to a method for manufacturing an internal casing of the aforementioned type, which method comprises the following steps:
 arranging reinforcing fibers in a mold, said fibers preferably being surface-treated with a compatibilizer, for example a silane, in a region designed to become a neck designed to delimit the opening of a hollow body,
 molding a hollow body and a neck by injecting or by rotationally molding or by extrusion blow molding, preferably by extrusion blow molding, a first polymer material in the mold.

The invention also relates to a method for manufacturing an internal casing of the aforementioned type, which method comprises the following steps:
 arranging a neck in a mold, the neck being designed to delimit the opening of a hollow body, the neck being made of a composite material composed of a second polymer material loaded with reinforcing fibers,
 molding a hollow body by extrusion blow molding a first polymer material in the mold, wherein:
during the extrusion blow molding, the first polymer material surrounds some of the composite material of the neck and the second polymer material at least partially melts upon contact with the first polymer material, such that, after the extrusion blow molding, the first polymer material is molded over the neck and the neck is joined to the hollow body by molecular entanglement of polymer chains of the first polymer material and polymer chains of the second polymer material.

Preferably, the neck is preheated in the mold or before being positioned in the mold in order to promote the molecular entanglement of polymer chains.

The invention also relates to a method for manufacturing an internal casing of the aforementioned type, which method comprises the following steps:
- arranging a neck in a mold, the neck being designed to delimit the opening of a hollow body, the neck being made of a composite material composed of a second polymer material loaded with reinforcing fibers,
- molding a hollow body by rotationally molding a first polymer material using a mold heated to a temperature above the melting point of the first polymer material, wherein:

during rotational molding, the first polymer material surrounds some of the composite material of the neck and melts at least partially by being heated via the mold, the second polymer material melts at least partially upon contact with the first polymer material and/or upon contact with the mold, such that, after rotational molding, the first polymer material is molded over the neck and the neck is joined to the hollow body by molecular entanglement of polymer chains of the first polymer material and polymer chains of the second polymer material.

Preferably, the neck is preheated in the mold or before being positioned in the mold in order to promote the molecular entanglement of polymer chains.

Finally, the invention relates to a storage tank for pressurized fluid for a motor vehicle, preferably for hydrogen, comprising:
- an internal casing of the aforementioned type,
- a base attached to the neck of the internal casing, outside the neck,
- a gasket arranged between the neck and the base, preferably radially,
- an external reinforcing casing attached around the internal casing and the base.

BRIEF DESCRIPTION OF THE FIGURES

The invention will be better understood on reading the description which follows, given solely by way of example and with reference to the appended drawings, in which.

DETAILED DESCRIPTION

Figure 1:
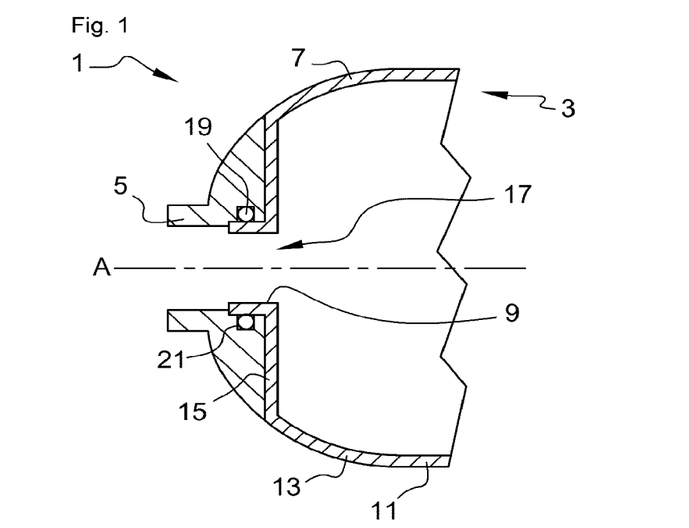
FIG. 1 is a partial schematic view in longitudinal section of a tank comprising an internal casing according to a first embodiment of the invention.

As illustrated in FIG. 1, the tank 1 for storing pressurized fluid, for example for a motor vehicle, comprises an internal casing 3 and an interface part forming a base 5. The base 5 of the tank is used, for example, to receive means for connecting the tank in order to fill or empty it. Preferably, the base 5 is made of metal, for example stainless steel. The tank 1 may also comprise an external reinforcing casing (not shown) attached around the internal casing 3 and the base 5, in particular in order to withstand the pressure of the fluid. The tank 1 is preferably intended for storing hydrogen under pressure, for example at a pressure of at least 350 bar in the filled state, preferably of at least 700 bar in the filled state. A pressure of 700 bar is typical of light vehicle applications, while a pressure of 350 bar is typical of heavy duty and bus applications.

The internal casing 3 comprises a hollow body 7 and a neck 9. The base 5 is attached to the neck 9 of the internal casing 3, on the outside of the neck 9.

The hollow body 7 is for example composed of a cylinder 11 (only a portion of the cylinder 11 is illustrated in FIG. 1), at least one end of which has a hemispherical portion 13. The end of the hemispherical portion 13 opposite the cylinder 11 is in this case in the form of a disk 15, for example provided with an opening 17. The opening 17 is in this example oriented substantially coaxially with the axis A of the cylinder and of the corresponding hemispherical portion 13.

In one particular example, the two ends of the cylinder 11 have a hemispherical portion 13, a disk 15 and an opening 17.

The neck 9 is arranged on the hollow body 7 and delimits the opening 17 of the hollow body 7. The neck 9 is designed to receive the base 5. The base 5 is attached to the neck 9 in a sealed manner by virtue of a gasket 19 arranged between the neck 9 and the base 5. In the embodiment illustrated in FIG. 1, the neck 9 is oriented towards the outside of the internal casing 3 and receives the base 5 on its outer circumference.

In the example illustrated in FIG. 1, the base 5 is attached to the neck 9 by means of screwing. Therefore, at least part of the outer circumference of the neck 9 is provided with a thread onto which the base 9 is screwed via a corresponding thread.

The gasket 19 is arranged between the base 5 and the neck 9, preferably radially. In the example illustrated in FIG. 1, the gasket 19 is annular and arranged radially inside an annular recess 21 in the base 5.

The hollow body 7 comprises at least one layer made of a first polymer material.

For example, the hollow body 7 comprises a single layer.

Alternatively, the hollow body 7 comprises a plurality of layers, at least one layer being made of the first polymer material. For example, a layer forming a barrier to the pressurized fluid may be used, in particular one made of EVOH. The role of the barrier layer is to prevent the diffusion of the pressurized fluid through the width of the hollow body 7 and out of the internal casing 3. Said barrier layer is for example placed between two layers of adhesive. Said adhesive layers ensure adhesion between the barrier layer and layers of polymer material, in particular polyethylene. The internal and external layers of the hollow body 7 are for example made of a polymer, such as polyethylene, in particular high density polyethylene. The hollow body 7 may therefore be produced by means of extrusion, in particular co-extrusion, by means of molding, by means of blow molding, more particularly by means of extrusion blow molding, by means of film blow extrusion, by means of rolling, by means of thermoforming, by means of rotational molding, by means of injection or by means of injection blow molding.

The neck 9 is made of a composite material composed of a second polymer material loaded with reinforcing fibers. Said composite material has a resistance to deformation that is greater than the resistance to deformation of the first polymer material.

In the neck 9, the reinforcing fibers are for example dispersed within the second polymer material. Local deformation is therefore lower.

Therefore, the neck 9 is joined to the hollow body 7 by molecular entanglement of polymer chains of the first polymer material and polymer chains of the second polymer material.

The first polymer material is for example thermoplastic, in particular semi-crystalline.

The second polymer material is for example thermoplastic, in particular semi-crystalline.

For example, the first polymer material and the second polymer material are part of the same family of polymers, preferably of the family of polymers chosen from the group comprising the polyamide (PA) family, the polyphthalamide (PPA) family, the polyolefin family, the polyketone (PK) family, the polyacetal family.

For some polymer materials, for example polyethylene (PE), the short chain branching distribution index influences the resistance to deformation, in particular the creep. Therefore, the resistance to deformation, in particular to creep, is improved with a higher short chain branching distribution index.

In one particular example, the first polymer material is identical to the second polymer material. In this case, the hollow body 7 is made of a first polymer material, not loaded with reinforcing fibers, while the neck 9 is made of a composite material composed of the same polymer material loaded with reinforcing fibers.

The reinforcing fibers 22 are mineral or organic, natural or synthetic fibers, preferably chosen from the group comprising glass fibers, carbon fibers, polymer fibers, natural fibers, metal fibers, metal alloy fibers, ceramic fibers, basalt fibers. The group of synthetic fibers includes aramid and polyester in particular. The group of natural fibers includes hemp and sisal in particular. The reinforcing fibers may be made of glass, carbon or polymer. In the case of a polymer, it may for example be an aromatic polyamide such as an aramid. The glass fibers are preferably fibers of E glass, S glass or another type of glass. The reinforcing fibers are preferably compatible with a thermoplastic material, generally compatible with polyolefins, in particular with HDPE (high-density polyethylene). For example, the reinforcing fibers are surface-treated with a compatibilizer, for example a silane or a compound comprising maleic anhydride groups.

The diameter of the reinforcing fibers is for example between 0.1 µm and 1 mm, preferably between 5 µm and 50 µm, more preferably between 3 µm and 30 µm.

The reinforcing fibers may be short, long or continuous. Short fibers are generally between 1 µm and 10 µm in length. Long fibers are generally between 1 mm and 11 mm in length. Continuous fibers are at least several centimeters long.

In the case of short or long reinforcing fibers, the content of reinforcing fibers in the composite material is generally between 10% and 60% by weight. Below 10% by weight, the improvement in mechanical characteristics such as resistance to deformation is not significant. Above 60% by weight, the material is difficult to use for manufacturing, in particular for injection molding.

A composite material composed of ultra-high molecular weight polyethylene, also known by the acronym UHMPE, and reinforcing fibers may be used. For example, there is the composite material RTP 799 X 138861 D from the company RTP, in which the reinforcing fibers are glass fibers. This composite material is in particular compatible with injection molding despite its very high molecular weight.

In the case of long fibers, glass or carbon fibers may be used.

In the case of continuous reinforcing fibers, the content of reinforcing fibers in the composite material is generally between 30 and 70% by volume. The continuous fibers are, for example, pre-impregnated with a polymer material and are therefore called "prepreg". They may be woven, non-woven, that is to say dispersed randomly, or even unidirectional.

In the case of woven continuous fibers, there is for example the Dynalite material (registered trademark) 111 RG600(3)/47% from the company Lanxess. This "prepreg" contains 47% by volume continuous glass fibers, impregnated with high-density polyethylene.

Unidirectional continuous fibers are for example in the form of a unidirectional tape, for example Celstran (registered trademark) CFR-TP HDPE-GF70-01 from the company Celanese. In this case, the fiber content is for example 70% by weight or 45% by volume.

The following examples are given for internal casings made by means of injection molding:

Example 1

First polymer: PA6. The elastic tensile strength at 23° C. is approximately 45 MPa to 48 MPa. For example, the polymer sold under the name UBE NYLON (registered trademark) 1218IU from the company UBE INDUSTRIES.

Composite material: PA6 loaded with short glass fibers. For example:
  with 10% by weight of glass fibers, ACCUTECH (registered trademark) NY0730G10L1 composite material from the company A. Schulman, the elastic tensile strength is approximately 102 MPa;
  with 20% by weight of glass fibers, ACCUTECH (registered trademark) NY0730G20L composite material from the company A. Schulman, the elastic tensile strength is approximately 120 MPa;
  with 30% by weight of glass fibers, ACCUTECH (registered trademark) NY0730G30L composite material from the company A. Schulman, the elastic tensile strength is approximately 144 MPa.

Example 2

First polymer: HDPE or high-density polyethylene. The elastic tensile strength is approximately 22 MPa. For example, the polymer sold under the name Lupolen (registered trademark) GX5038 from the company Lyondellbasell.

Composite material: HDPE or high-density polyethylene, loaded with short glass fibers. For example:
  with 10% by weight of glass fibers, THERMOFIL (registered trademark) 10F0V2 X066 composite material from the company Sumika, the elastic tensile strength is approximately 30 MPa.

The orientation of the reinforcing fibers in the composite material can be adapted in order to optimize the mechanical characteristics, such as resistance to deformation, in the direction of the stress applied by the gasket 19.

For example, the reinforcing fibers are woven. The reinforcing fibers thus form a textile reinforcement 22.

The elements common to all the embodiments of the invention are referenced with the same reference signs as those of the embodiment illustrated in FIG. 1.

Several examples of methods of manufacturing an internal casing 3 will be described below.

Figure 2:
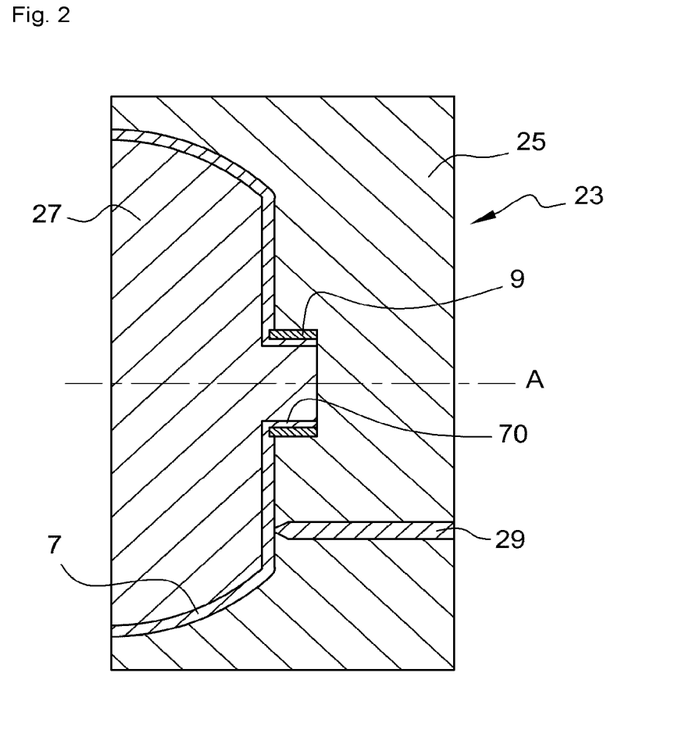
FIG. 2 is a partial schematic sectional view of a mold allowing for the manufacture according to a first embodiment of an internal casing similar to that of FIG. 1.

In the example of the method of manufacturing an internal casing 3 illustrated in FIG. 2, a mold 23 is provided, which is for example composed of a fixed shell 25 and a movable shell 27.

The fixed shell 25 comprises a cavity delimiting the hollow body 7 and the neck 9, as well as at least one first injection hole 29. The injection hole 29 is for example arranged axially and opens out into the cavity, for example at the level of the region delimiting the hollow body 7.

According to the method illustrated in FIG. 2, a neck 9 is placed in the mold 23, in particular on the fixed shell 25. The neck 9 is therefore made beforehand from a composite material composed of a polymer material, called the second polymer material, and of reinforcing fibers.

A polymer material, called the first polymer material, is then injected through the injection hole 29 in order to form the hollow body 7 and to join the hollow body 7 to the neck 9 by molecular entanglement of polymer chains of the first polymer material and polymer chains of the second polymer material.

During injection, the first polymer material, which is molten, surrounds the inner circumference of the neck 9 (see FIG. 2, reference sign 70) and the second polymer melts at least partially upon contact with the first polymer material. For this purpose, the first polymer material is injected into the mold 23 at a temperature at least 10° C. above the melting point of the second polymer material. After injection, the first polymer material is molded over the neck 9 and the neck 9 is joined to the hollow body 7 by molecular entanglement of polymer chains of the first polymer material and polymer chains of the second polymer material. An internal casing 3 is thus formed, comprising a hollow body 7 comprising a layer made of a first polymer material and a neck 9 arranged on the hollow body 7 and delimiting an opening 17 of the hollow body 7.

In this example, the second polymer material may be identical to the first polymer material or may be different from the first polymer material.

Figure 3:
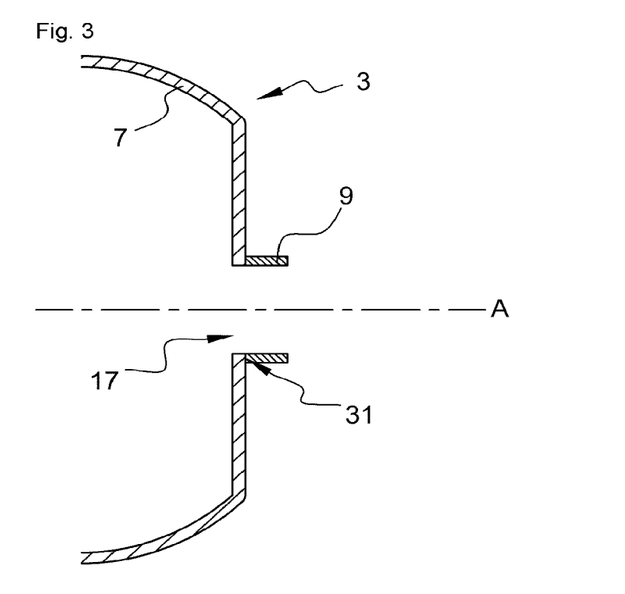
FIG. 3 is a partial schematic sectional view illustrating the manufacture according to a second embodiment of an internal casing similar to that of FIG. 1.

In another example of the manufacturing method illustrated in FIG. 3, a previously manufactured hollow body 7 is provided, which comprises an opening 17. The hollow body 7 is made of a first polymer material. A previously manufactured neck 9 is also provided. The neck 9 is made of a composite material composed of a second polymer material loaded with reinforcing fibers.

In the example of the method for manufacturing an internal casing 3 illustrated in FIG. 3, the neck 9 and the hollow body 7 are assembled by means of welding. For example, the welding is carried out at an annular contact zone 31 between the neck 9 and the hollow body 7. Therefore, after welding, the neck 9 is joined to the hollow body 7 by molecular entanglement of polymer chains of the first polymer material and polymer chains of the second polymer material. An internal casing 3 is thus formed, comprising a hollow body 7 comprising a layer made of a first polymer material and a neck 9 arranged on the hollow body 7 and delimiting an opening 17 of the hollow body 7.

If the second polymer material is a polyphthalamide, hot gas welding may, for example, be used. The gas is preferably an inert gas such as nitrogen, thus making it possible to avoid oxidation of the polymer material.

In this example, the second polymer material may be identical to the first polymer material or may be different from the first polymer material.

Figure 4:
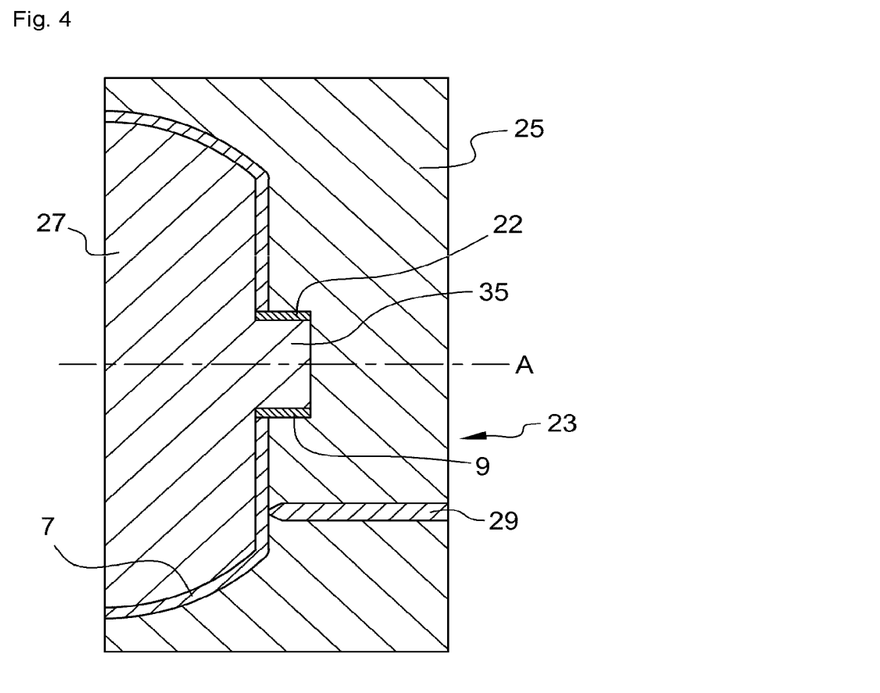
FIG. 4 is a partial schematic sectional view of a mold allowing for the manufacture according to a third embodiment of an internal casing similar to that of FIG. 1.

Another example of the manufacturing method illustrated in FIG. 4 differs from the example illustrated in FIG. 2 in that instead of arranging a neck 9 in the mold 23, continuous reinforcing fibers are arranged in the mold 23, in a region designed to become a neck 9 designed to delimit the opening 17 of a hollow body 7. Thus, the reinforcing fibers are for example arranged around a journal 35 of the movable shell 27. In the example illustrated in FIG. 4, said reinforcing fibers are woven in the form of a textile reinforcement 22.

A first polymer material is then injected into the mold 23 through the injection hole 29 in order to form the hollow body 7 and the neck 9 by means of molding. Therefore, in this case, the polymer material composing the hollow body 7 is identical to the polymer material of the neck 9. In this case, the hollow body 7 is therefore made of a first polymer material, not loaded with reinforcing fibers, while the neck 9 is made of a composite material composed of the same polymer material loaded with reinforcing fibers, for example woven in the form of a textile reinforcement 22. In addition, the hollow body 7 and the neck 9 are joined by molecular entanglement of polymer chains of the polymer material. An internal casing 3 is thus formed, comprising a hollow body 7 comprising a layer made of a first polymer material and a neck 9 arranged on the hollow body 7 and delimiting an opening 17 of the hollow body 7.

Figure 5:
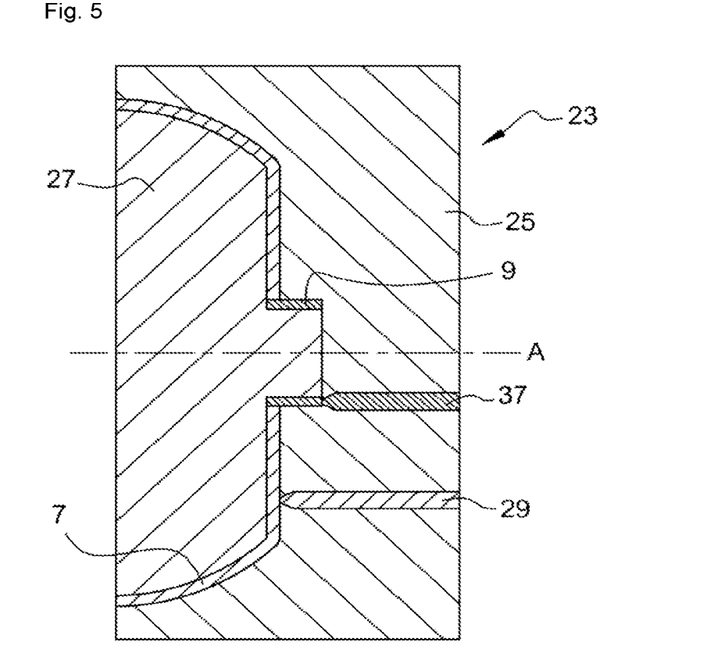
FIG. 5 is a partial schematic sectional view of a mold allowing for the manufacture according to a fourth embodiment of an internal casing similar to that of FIG. 1.

A final example of the manufacturing method illustrated in FIG. 5 differs from the example illustrated in FIG. 2 in that instead of arranging a neck 9 in the mold 23, the mold 23 comprises at least one second injection hole 37 that opens into a region designed to become a neck 9 designed to delimit the opening 17 of a hollow body 7.

During the method, a first polymer material is injected into the mold 23 through the injection hole 29 in order to form the hollow body 7, and simultaneously a composite material composed of a second polymer material loaded with reinforcing fibers is injected into the mold 23 through the injection hole 37 in order to form the neck 9. In the region in which the hollow body 7 and the neck 9 are joined, the mold 23 has a movable element (not shown) which defines an injection cavity for the second polymer material. As soon as the first and second polymer materials are injected, the movable element is removed in order to allow the second polymer material to come into contact with the first polymer material. Thus, the hollow body 7 and the neck 9 are joined at a predefined location. Alternatively, the second polymer material can be injected a few seconds before or after the injection of the first polymer material, for example one second after. In this example, the second polymer material may be identical to the first polymer material or may be different from the first polymer material.

Therefore, after injection, the neck 9 is joined to the hollow body 7 by molecular entanglement of polymer chains of the first polymer material and polymer chains of the second polymer material. An internal casing 3 is thus formed, comprising a hollow body 7 comprising a layer made of a first polymer material and a neck 9 arranged on the hollow body 7 and delimiting an opening 17 of the hollow body 7.

Figure 6:
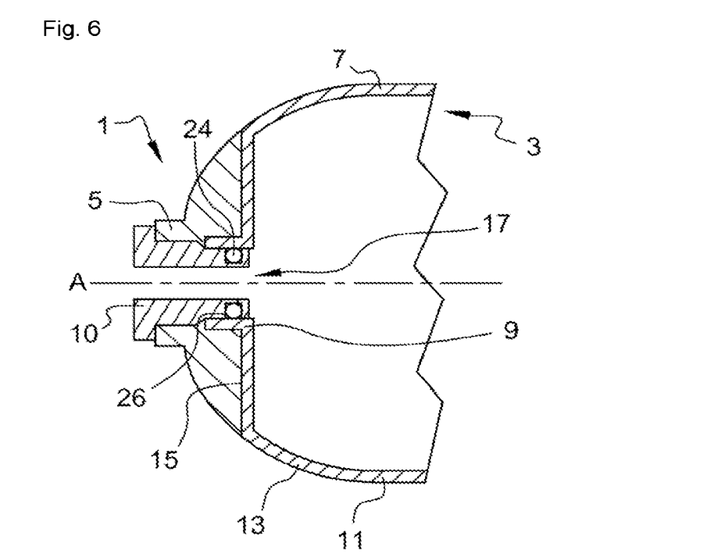
FIG. 6 is a partial schematic view in longitudinal section of a tank comprising an internal casing according to a second embodiment of the invention.

FIG. 6 illustrates a tank comprising an internal casing according to a second embodiment of the invention. In this alternative embodiment, the interface part forms a valve 10 and the neck 9 is designed to receive the valve 10. The valve 10 is used, for example, as a means of connecting the tank in order to fill or empty same. The valve 10 is attached to the neck 9 of the internal casing 3, inside the neck 9. The valve 10 is attached to the neck 9 in a sealed manner by virtue of a gasket 24 arranged between the neck 9 and the valve 10. In this embodiment, the neck 9 is oriented towards the outside of the internal casing 3 and receives the valve 10 on its inner circumference.

In the example illustrated in FIG. 6, the valve 10 is attached to the neck 9 by screwing the valve 10 onto the base 5. Therefore, at least part of the inner circumference of the base 5 is provided with a thread onto which the valve 10 is screwed via a corresponding thread.

The gasket 24 is arranged between the valve 10 and the neck 9, preferably radially. In the example illustrated in FIG. 6, the gasket 24 is annular and arranged radially inside an annular recess 26 in the valve 10.

In an alternative embodiment (not shown), the interface part forms a sealing plug. The sealing plug is used, for example, as a means of closing one end of the cylinder 11.

The invention is not limited to the embodiments described here, and other embodiments will become clearly apparent to a person skilled in the art.

Although the invention illustrated in FIG. 1 shows a neck 9 oriented towards the outside of the internal casing 3 and receiving the base 5 on its outer circumference, a person skilled in the art will easily understand that such a neck 9 could be oriented towards the inside of the internal casing 3 and receive the base 5 on its inner circumference (not shown). Another method of manufacturing an internal casing 3 that is similar to the manufacturing method illustrated in FIG. 5 differs herefrom in that the second polymer material is polymerized in situ in the mold 23 in the region of the neck 9. For example, in situ polymerization of polyamide from caprolactam could be carried out. This process is commonly referred to as "resin transfer molding" or under the acronym RTM. Caprolactam is the constituent monomer of PA6 and has the advantage, before polymerization, of being less viscous than PA6, which makes it possible to impregnate a textile reinforcement with less pressure.

For this, a mixture of several compounds is produced prior to its injection via the second injection hole 37. These compounds are preferably melted previously at a temperature of between 90° C. and 110° C. The polymerization reaction typically lasts 2 to 3 minutes.

In a first exemplary embodiment, the first material is composed of caprolactam, an activator, an additive and reinforcing fibers. In a second exemplary embodiment, the first material is composed of caprolactam, an activator and an additive. In this second exemplary embodiment, reinforcing fibers are placed in the mold 23, in a region designed to become a neck 9 designed to delimit the opening 17 of a hollow body 7. Thus, the reinforcing fibers are for example arranged around a journal 35 of the movable shell 27. Said reinforcing fibers are for example woven in the form of a textile reinforcement 22. In these two exemplary embodiments, the second material is composed of caprolactam and a catalyst. The temperature of the mold is preferably 150° C. in order to optimize the polymerization reaction while allowing easy removal of the internal casing from the mold after polymerization.

These two materials can be stored separately, and mixed upstream of the injection hole 37 to form the aforementioned mixture.

During the method, a first polymer material is injected into the mold 23 through the injection hole 29 in order to form the hollow body 7, and simultaneously the aforementioned mixture is injected through the injection hole 37 into the region designed to become a neck 9 designed to delimit the opening 17 of a hollow body 7. After injection, the mixture polymerizes in situ and thus forms the neck 9. Alternatively, the aforementioned mixture can be injected before injecting the first polymer material, for example one minute before, such that the polymerization reaction of the second material begins before same comes into contact with the first polymer material.

The invention claimed is:

1. An internal casing for a tank for storing pressurized fluid for a motor vehicle, comprising:
   a hollow body comprising at least one layer made of a first polymer material; and
   a neck arranged on the hollow body and delimiting an opening of the hollow body, the neck being designed to receive an interface part mounted on the neck in a sealed manner by means of a gasket arranged between the neck and the interface part, the neck being made of a composite material composed of a second polymer material loaded with reinforcing fibers,
   the composite material having a resistance to deformation that is greater than the resistance to deformation of the first polymer material, and
   the neck being joined to the hollow body by molecular entanglement of polymer chains of the first polymer material and polymer chains of the second polymer material.

2. The internal casing according to claim 1, wherein the reinforcing fibers are chosen from the group comprising glass fibers, carbon fibers, polymer fibers, natural fibers, metal fibers, metal alloy fibers, ceramic fibers, basalt fibers.

3. The internal casing according to claim 1, wherein at least some of the reinforcing fibers form a textile reinforcement.

4. The internal casing according to claim 1, wherein:
   the first polymer material is thermoplastic, and
   the second polymer material is thermoplastic.

5. The internal casing according to claim 4, wherein:
   the first polymer material is semi-crystalline thermoplastic, and
   the second polymer material is semi-crystalline thermoplastic.

6. The internal casing according to claim 1, wherein the first polymer material and the second polymer material are part of the same family of polymers.

7. The internal casing according to claim 6, wherein the first polymer material and the second polymer material are chosen from the group consisting of the polyamide family, the polyphthalamide family, the polyolefin family, the polyketone family and the polyacetal family.

8. The internal casing according to claim 1, wherein the second polymer material is identical to the first polymer material.

9. The internal casing according to claim 1, wherein the hollow body comprises a plurality of layers, at least one layer being made of the first polymer material.

10. A method for manufacturing an internal casing according to claim 1, the method comprising:
    providing a hollow body having an opening;
    providing a neck designed to delimit the opening of the hollow body; and
    assembling the neck and the hollow body by means of welding.

11. A method for manufacturing an internal casing according to claim 1, the method comprising:
    arranging a neck in a mold, the neck being designed to delimit the opening of a hollow body, the neck being made of a composite material composed of a second polymer material loaded with reinforcing fibers; and molding a hollow body by injecting or by rotationally molding a first polymer material in the mold, wherein:

during injection or rotational molding, the first polymer material surrounds some of the composite material of the neck and the second polymer material at least partially melts upon contact with the first polymer material, such that, after injection, the first polymer material is molded over the neck and the neck is joined to the hollow body by molecular entanglement of polymer chains of the first polymer material and polymer chains of the second polymer material.

12. The method for manufacturing an internal casing according to claim 1, the method comprising:

molding a hollow body in a mold by injecting a first polymer material via a first injection hole; and simultaneously co-molding in the mold a neck delimiting an opening of the hollow body by injecting a composite material composed of a second polymer material loaded with reinforcing fibers via a second injection hole, such that, after molding, the neck is joined to the hollow body by molecular entanglement of polymer chains of the first polymer material and polymer chains of the second polymer material.

13. The method for manufacturing an internal casing according to claim 1, the method comprising:

arranging reinforcing fibers in a mold, said fibers being surface-treated with a silane, in a region designed to become a neck designed to delimit the opening of a hollow body; and molding a hollow body and a neck by injecting or by rotationally molding or by extrusion blow molding, a first polymer material in the mold.

14. The method according to claim 13, wherein the molding is performed by extrusion blow molding.

15. The method for manufacturing an internal casing according to claim 1, the method comprising:

arranging a neck in a mold, the neck being designed to delimit the opening of a hollow body, the neck being made of a composite material composed of a second polymer material loaded with reinforcing fibers; and molding a hollow body by extrusion blow molding a first polymer material, wherein:

during extrusion blow molding, the first polymer material surrounds some of the composite material of the neck and the second polymer material at least partially melts upon contact with the first polymer material, such that, after extrusion blow molding, the first polymer material is molded over the neck and the neck is joined to the hollow body by molecular entanglement of polymer chains of the first polymer material and polymer chains of the second polymer material.

16. The method for manufacturing an internal casing according to claim 1, the method comprising:

arranging a neck in a mold, the neck being designed to delimit the opening of a hollow body, the neck being made of a composite material composed of a second polymer material loaded with reinforcing fibers; and molding a hollow body by rotationally molding a first polymer material using a mold heated to a temperature above the melting point of the first polymer material, wherein:

during rotational molding, the first polymer material surrounds some of the composite material of the neck and melts at least partially by being heated via the mold, the second polymer material melts at least partially upon contact with the first polymer material and/or upon contact with the mold, such that, after rotational molding, the first polymer material is molded over the neck and the neck is joined to the hollow body by molecular entanglement of polymer chains of the first polymer material and polymer chains of the second polymer material.

17. A storage tank for pressurized fluid for a motor vehicle, comprising:

an internal casing according to claim 1;

a base attached to the neck of the internal casing, on the outside of the neck;

a gasket radially arranged between the neck and the base; and an external reinforcing casing attached around the internal casing and the base.

18. The storage tank for pressurized fluid for a motor vehicle according to claim 17, wherein the storage tank is for hydrogen.

19. The internal casing according to claim 1, further comprising the interface part and gasket are present and the interface part is mounted on the neck in a sealed manner by means of the gasket arranged between the neck and the interface part.

* * * * *